J. PEARSON.

CAR ROOF.

APPLICATION FILED JUNE 21, 1911.

Reissued Aug. 22, 1911.

13,285.

3 SHEETS—SHEET 1.

Witnesses:

E. A. D. Perry

G. W. Domarus Jr.

Inventor:

John Pearson

By J. McRoberts his Atty.

J. PEARSON.

CAR ROOF.

APPLICATION FILED JUNE 21, 1911.

Reissued Aug. 22, 1911.

13,285.

3 SHEETS—SHEET 2.

Witnesses:

E. A. Perry

G. W. Domarus Jr.

Inventor:

John Pearson

By J. McRoberts his Atty.

J. PEARSON.

CAR ROOF.

APPLICATION FILED JUNE 21, 1911.

Reissued Aug. 22, 1911.

13,285.

3 SHEETS—SHEET 3.

Witnesses:

E. D. Perry

G. V. D. Smarus Jr.

Inventor:

John Pearson

By J. McRoberts his Att'y.

UNITED STATES PATENT OFFICE.

JOHN PEARSON, OF CHICAGO, ILLINOIS.

CAR-ROOF.

13,285. Specification of Reissued Letters Patent. Reissued Aug. 22, 1911.

Original No. 988,380, dated April 4, 1911, Serial No. 533,336. Application for reissue filed June 21, 1911. Serial No. 634,650.

*To all whom it may concern:*

Be it known that I, JOHN PEARSON, a citizen of the United States, residing at Chicago in the county of Cook and State of Illinois, have invented certain new and useful Improvements in Car-Roofs, of which the following is a specification, reference being had therein to the accompanying drawings.

My invention relates to metallic car roofs, and consists in the peculiar and novel features herein described and then pointed out in the appended claims.

Figure 1:
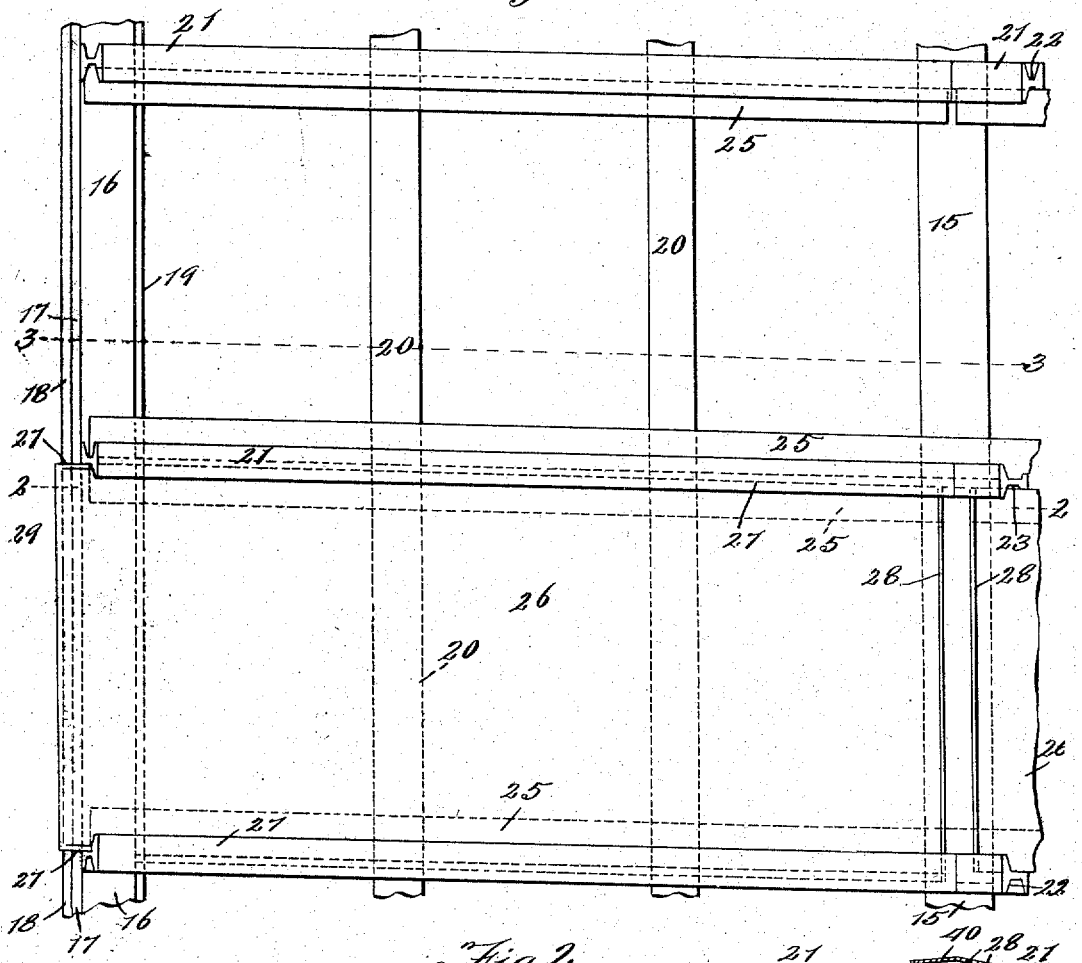
Figure 2:
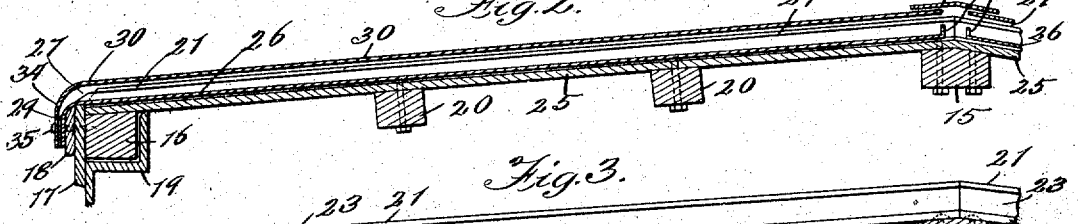
Figure 3:
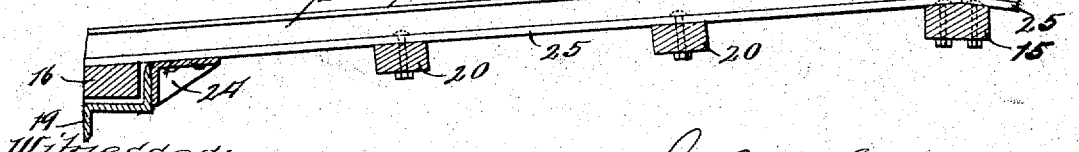
Figure 4:
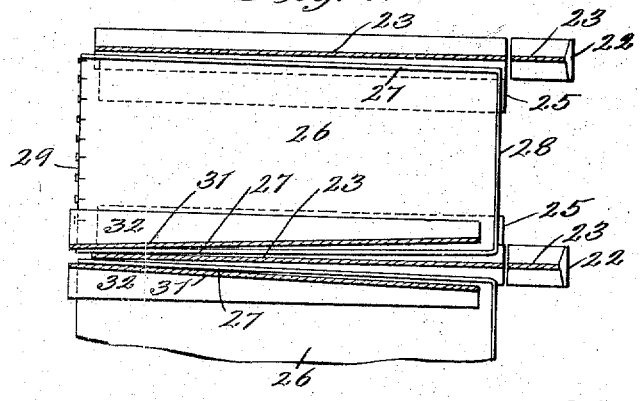
Figure 5:
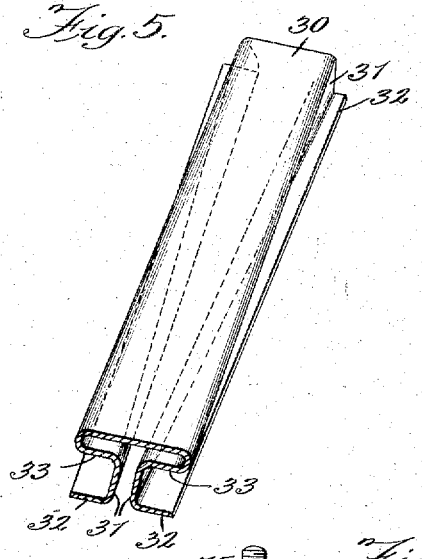
Figure 6:
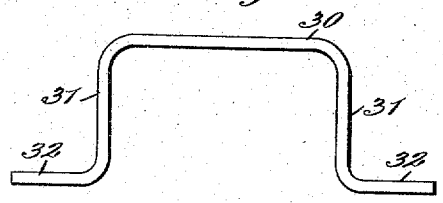
Figure 7:
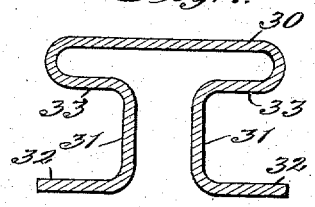
Figure 8:
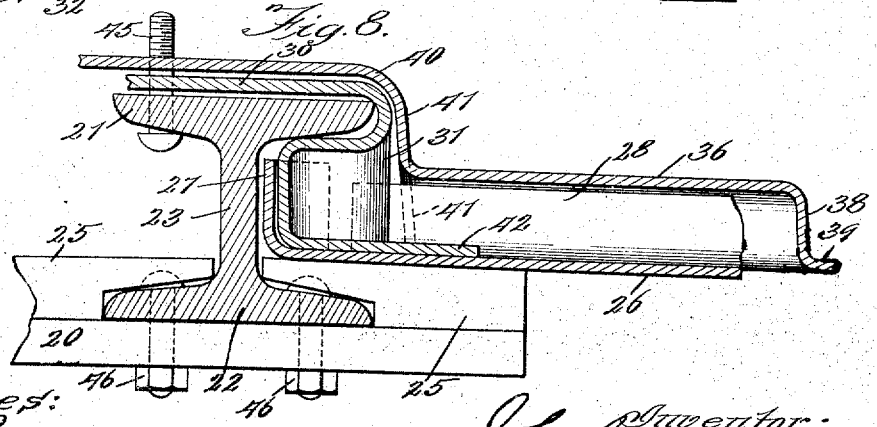
Figure 9:
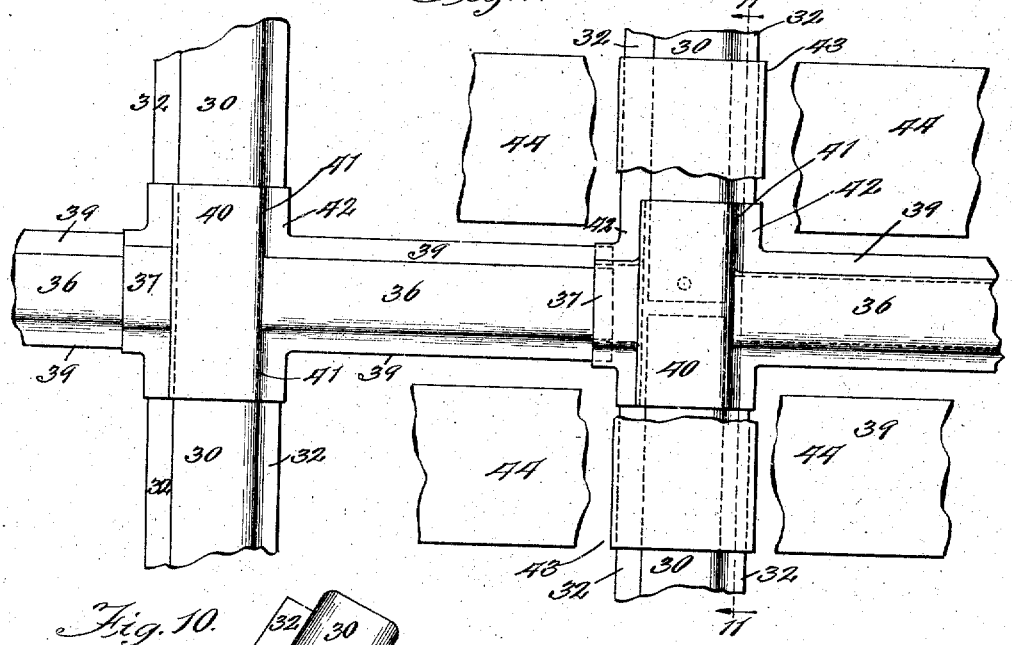
Figure 10:
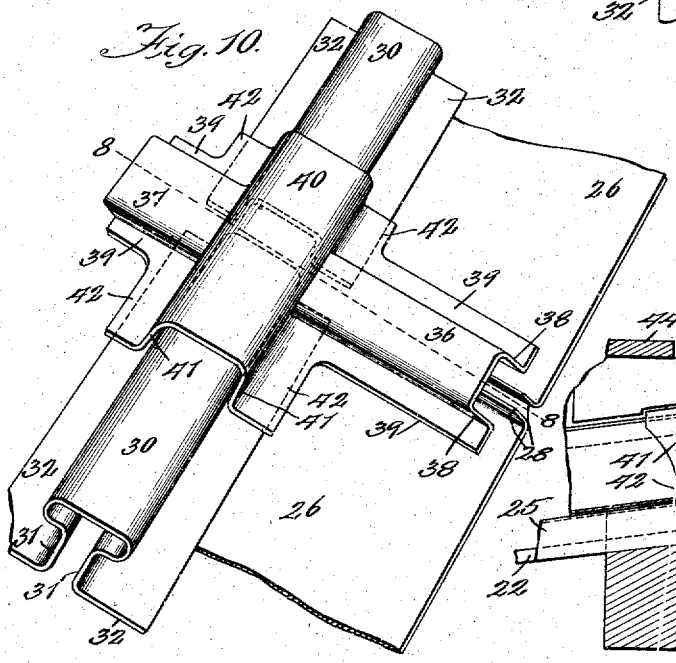
Figure 11:
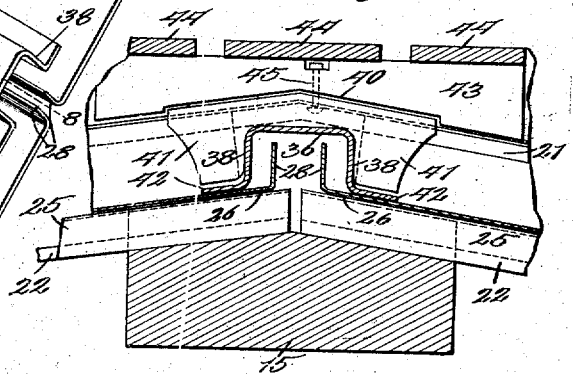

In the accompanying drawings, which illustrate practical embodiments of the various features of my invention and in which the same reference numerals indicate similar parts in the different figures, Figure 1 is a top plan view of a portion of a car roof showing certain features of my invention, parts being omitted for the purposes of illustration; Fig. 2 is a sectional view on the line 2—2 of Fig. 1, where one of the roof panels is shown in place and with one of the car line-caps and the ridge cover in place; Fig. 3 is a sectional view taken on the line 3—3 of Fig. 1 where the roof panel or sheet is omitted; Fig. 4 is a top plan view of a section of the roof with the carline-webs and the sides of a pair of panels and of an associated carline-cap in section; Fig. 5 is a perspective view of one of the carline-caps with its outer end shown in section; Fig. 6 is an end view of the inner end of the carline-cap in elevation; Fig. 7 is a sectional view of the carline-cap near its outer end; Fig. 8 is a sectional detail view on the line 8—8 of Fig. 10 showing one of the carlines and portions of an assembled panel, a carline-cap, and a ridge-cap section; Fig. 9 is a top plan view of a section of the roof at the ridge showing the arrangement of ridge-caps, carlines, and other parts; Fig. 10 is a perspective view showing some of the parts of Fig. 9; and Fig. 11 is a sectional view on the line 11—11 of Fig. 9.

In the drawings the reference numeral 15 designates the ridge pole, 16 the side-plates, 17 the side sheathing, 18 the facia or crown-mold, 19 the longitudinal metallic side-bars substantially Z-shape in cross-section, and 20 the longitudinal wooden purlins. Extending transversely of the roof at suitable intervals are the metal carlines which in the present invention are in the shape of I-beams having upper and lower flanges 21 and 22 and connecting webs 23, the carlines extending from side to side of the car and resting upon the ridge pole, purlins, and side plates. The carlines are connected to the side bars 19 by means of suitable metallic brackets 24 which are bolted to the bars and to the lower flanges of the carlines as clearly shown in Fig. 3. Also extending transversely of the roof are a series of wooden strips 25 which are associated in pairs with the carlines, being cut-away or routed-out along one edge to rest upon the lower flanges 22 thereof as shown in Fig. 8 and being secured to the side-plates and purlins by bolts or other suitable connecting devices as clearly shown in Fig. 3. The carlines are arranged parallel with each other at suitable intervals, and the roof sheets or panels 26 which extend from the ridge-pole outward to the eaves rest upon the wooden strips 25. Each sheet or panel is substantially rectangular in shape but is slightly narrower at its inner end than at its outer end, being slightly tapered inwardly for this purpose as clearly shown in Fig. 4, and is provided with upturned side flanges 27, and up-turned inner flange 28, and a down-turned outer flange 29 adapted to extend down upon the outer face of the crown-mold 18 as clearly shown in Fig. 2. By constructing the roof sheets in the inwardly tapered form shown I am enabled to interlock them with the carlines by means of suitable carline-caps in such manner as to securely hold them in place but to permit their inner ends to have a slight play or movement under any undue strains upon the car.

The carline-caps are of metal and each consists of an upper horizontal portion 30 of sufficient width to overlap the flanges 27 of a pair of panels or plates, down-turned sides 31, and outwardly extending flanges 32; at their inner ends adjacent the ridge pole the caps are formed in substantially inverted trough-shape as shown in Fig. 6, and from their inner ends the sides 31 are gradually inturned under the horizontal portion 30 as clearly shown in Fig. 5 toward their outer ends where they assume in cross-section the form shown at the left-hand end of Fig. 5 and in Fig. 7. These carline-caps extend from the ridge pole outwardly to the eaves where they are provided with down turned outer ends 34 overlying the down turned portions 29 of the roof panels, suitable fastening nails 35 passing through the down-turned portions 34 and 29 into the crown-mold and side-plates as shown in Fig. 3.

After the roof plates are assembled upon their supporting strips 25 on each side of the carlines, one of the carline-caps is slipped into place along the length of the associated carline beginning at its outer end and when the cap is in place in the position shown in Fig. 2 its down-turned sides embrace the upper flange of the carline and the outer portions of the up-turned flanges 27 of the associated panels as shown in Figs. 4 and 8, leaving the inner portions of these flanges free to move or play under strains or twisting actions of the car. I also provide a sectional ridge-cover, each section being adapted to interlock with the adjacent ends of a pair of opposite carline-caps at the ridge or center and extending longitudinally of the car over the up-turned inner flanges 28 of an opposite pair of plates and telescopically engaging the next section of the ridge-cover. This cover is made of metallic sections which are substantially in the form of a Roman cross, in which the cross-arms are shorter than the body; as shown in Figs. 9 and 10 the longitudinal portion of each section comprises a body 36 and head 37 each consisting of a trough-shaped structure comprising a top or upper portion, downturned sides 38, and lateral flanges 39 adapted to overlie and rest upon the upper faces of a pair of opposite plates or panels 26 with the upper flanges 28 thereof in the troughs provided by the sides and top. The cross-plate 40 of each section is raised above the plane of its body or head and is provided with downturned sides 41 and lateral flanges 42, the latter lying in the same plane as, and being extensions of, the flanges 39. Each cross-piece fits over and receives the adjacent ends of an opposite pair of carline-caps as clearly shown in Fig. 10; each head 37 is wider in cross-section than the body so that the end of the body fits within the head of the next section by an overlapping or telescoping joint as shown in Fig. 9. The cross-pieces 40 are oppositely inclined from their centers to fit the pitch of the roof as shown in Fig. 11, as are the flanges 39 and 42. In assembling the parts one of the sections of the ridge-cover is placed in position upon the adjacent ends of a pair of opposite carline-caps with the portion 40 overlying the same and holding them in alinement and with the portions 36 and 37 overlying the up-turned flanges 28 of the four associated plates or panels. As the head of each section is slightly larger than the body, it fits or telescopes over the lower end of the body of the next section as clearly shown in Fig. 9, thereby enabling the sections to lap and have slight longitudinal motion one upon the other caused by the movement of the parts of the roof when under undue strain.

A running board saddle 43 is fitted over each of the upturned portions 40 of the ridge-cover and the associated carline-caps, and the running boards 44 are properly secured to the saddles, which are bolted to the upper flanges 21 of the carlines as shown at 45 in Figs. 8 and 11. The saddles are suitably routed out or shaped to fit over the ridge-covers and over the carline-caps to rest upon the plates 26. The lower flanges of the carlines are secured to the purlins by bolts 46, the strips 25 being countersunk over the heads of the bolts as shown in Fig. 8.

Various modifications and changes in the arrangement and construction of the several parts may be made without departing from the scope of my invention.

I claim:—

1. In a car roof, a series of carlines extending transversely of the car, a series of metal panels extending from the side to the center of the car between the carlines and wider at their outer than their inner ends and having upturned side-flanges adjacent the carlines, and caps covering the joints between adjacent panels and allowing play of the inner ends of the panels.

2. In a car roof, a series of carlines extending transversely of the car, a series of metal panels extending from the side to the center of the car between the carlines and tapered toward the ridge of the car and having upturned side-flanges adjacent the carlines, and caps extending from the side to the center of the car and covering the carlines and tapered upturned flanges of adjacent panels and allowing play of the flanges of the panels between the carlines and caps from the side of the car toward the center.

3. In a car roof, a series of carlines having upper and lower flanges, a series of tapered metal panels with upturned flanges on the sides and inner end and extending from the side to the center of the car between the carlines, the upturned tapered flanges of the panels extending from the side to center of the car under the upper flanges of the carlines, and caps covering the upper flanges of the carlines and the upturned tapered flanges of adjacent panels and allowing play of the flanges of the panels between the carlines and caps from the side of the car toward the center.

4. In a car roof, a plurality of metal panels wider at their outer than at their inner ends and having upturned sides, and caps each having a top and sides covering the joint between two panels, the sides of the cap being gradually inturned under the top from the inner end toward the outer end.

5. In a car roof, a series of carlines, metal panels wider at their outer than at their inner ends and having upturned sides adjacent the carlines, and caps having tops and sides covering the carlines and joints between the panels, the sides of the caps being gradually inturned under the top from their inner toward their outer ends.

6. In a car roof, a series of I-shape carlines, metal panels wider at their outer than at their inner ends and having upturned sides adjacent the webs of the carlines, and caps having tops and side covering the joints between the panels, the sides of the caps being gradually inturned under the top from their inner toward their outer ends.

7. In a car roof, a plurality of carlines, metal panels between the carlines and tapering in width toward the ridge of the car, and carline-caps of inverted trough shape having greater cross-sectional area at their inner ends.

8. In a car roof, a plurality of I-shape carlines, metal panels between the carlines and tapering in width toward the ridge of the car, upturned flanges on the panels adjacent the carline-webs, and carline-caps of inverted trough shape having sides vertical at their inner ends and inturned at their outer ends.

9. In a car roof, a plurality of I-shape carlines, wood strips on each side thereof, metal panels resting on the strips between the carlines and tapering in width toward the ridge of the car, upturned flanges on the panels adjacent the carline-webs, and carline-caps of inverted trough shape having tops and sides, the latter being straight at their inner ends and gradually curved under the tops toward their outer ends.

JOHN PEARSON.

Witnesses:

J. McROBERTS,

HERBERT C. LUST.

Copies of this patent may be obtained for five cents each, by addressing the "Commissioner of Patents, Washington, D. C."